Jan. 29, 1929.  1,700,259
C. HARDY
VARIABLE CONDENSER
Filed Feb. 5, 1925
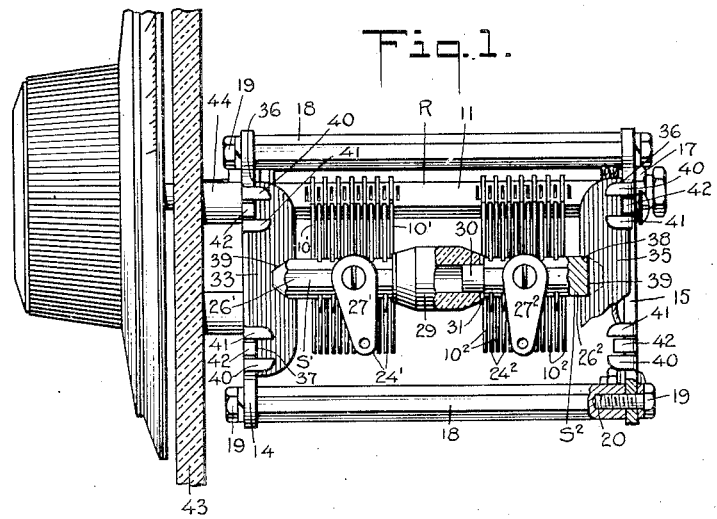
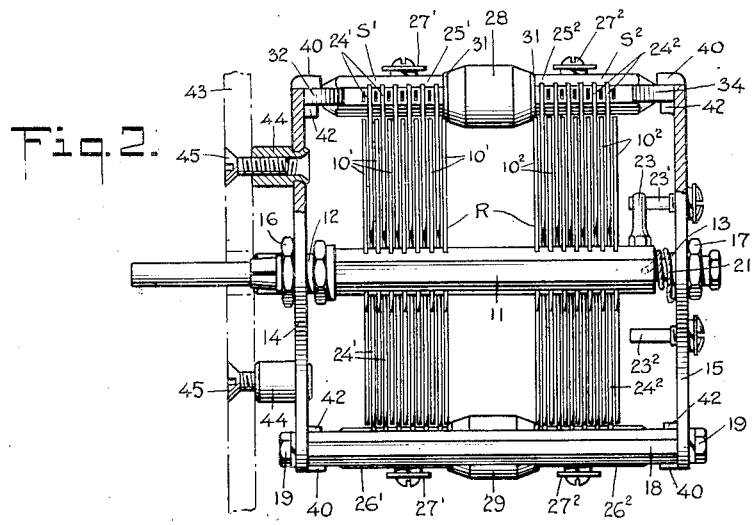
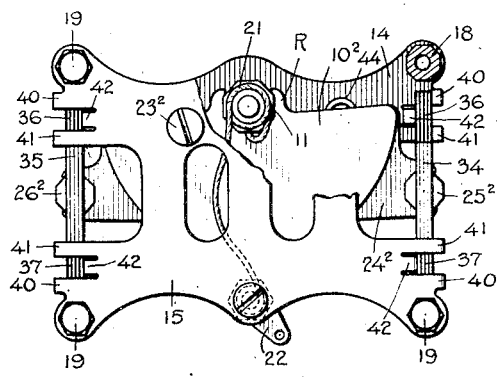
INVENTOR
Charles Hardy
BY
Cavanagh o James
ATTORNEYS Patented Jan. 29, 1929.

1,700,259

UNITED STATES PATENT OFFICE.

CHARLES HARDY, OF NEW YORK, N. Y., ASSIGNOR TO AMSCO PRODUCTS, INC., OF NEW YORK, N. Y., A CORPORATION OF NEW YORK.

VARIABLE CONDENSER.

Application filed February 5, 1925. Serial No. 6,997.

This invention relates to electrical condensers, and more particularly to variable air condensers; and has special reference to the provision of an improved variable air condenser of the rotor and stator type.

A principal object of my present invention comprehends the provision of improvements in variable air condensers having rotor and stator plate sets of the type disclosed in the copending application of Lester L. Jones Serial No. 718,423, filed June 7, 1924, in which a plurality of stator plate sets are insulatably supported from each other on the rotor plate set in a manner so as to reduce to a minimum the losses due to absorption media in the electrostatic field of the condenser, and in which the said plurality of stator plate sets are so inter-related and organized with the rotor plate set as to produce a condenser unit which may be made and assembled with great ease and rapidity.

It is well known that absorption media in the electrostatic field of a condenser have the effects of producing a phase angle or power loss in the condenser, and of varying the capacity characteristics of the same, since the capacity of a condenser having a phase angle varies with the frequency impressed thereon. The insulating medium which is used to separate or insulate the plates or plate sets of opposite potentials of a condenser provides an absorption region which undesirably produces high power losses, the effects of which are most pronounced in condensers of small capacity. The degree of absorption of these insulating media for any given insulating material or substance is directly dependent upon the strength of the field at such absorption media, and hence upon a number of factors, prime among which are the amount or volume of insulating material in the electrostatic field, the mass of the conductors of opposite potentials, and the proximity of such conducting mass to the insulating dielectric.

To produce a condenser of low loss and consequent high efficiency, it is therefore essential to reduce to a minimum the amount or volume of the absorption dielectric in the form of insulating supports, and to so dispose the conducting masses as to produce a weak electrostatic field in the region of the insulating supports. It is desirable, however, in order to firmly and ruggedly support the plate sets one with respect to the other, to employ sufficient insulating material which will withstand the supporting thrusts and stresses and the tendency to warping when under stress. A prime desideratum of my present invention comprehends the provision of a condenser embodying a plurality of stator plate sets insulated from each other, and a rotor plate set common thereto, in which the insulating supports between the plate sets are designed and arranged so that the maximum strength of the insulating material is utilized for support, while the amount or volume of the insulating material is reduced to a minimum, and in which, moreover, the insulating supports and the conducting material of opposite potentials are arranged so as to minimize the strength of the electrostatic field in the region of such insulating supports.

A further prime desideratum of the present invention relates to the provision of a variable air condenser embodying two independent stator plate sets and a rotor plate set preferably common thereto, in which the insulated mounting and supporting of the stator plate sets from each other and on the rotor plate set is so designed and carried out as to permit the handling with great facility of the plate sets and the rapid assembling of such sets into a condenser organization with the employment of standardized interengaging dovetailing means to hold the plate sets in assembled relation.

To the accomplishment of the foregoing and such other objects as may hereinafter appear, my invention consists in the elements and their relation one to the other, as hereinafter particularly described and sought to be defined in the claims; reference being had to the accompanying drawings which show a preferred embodiment of my invention, and in which:

Fig. 1 is a side elevational view of the improved condenser of my invention having parts broken away and other parts in section and showing the same mounted on a panel.

Fig. 2 is a top plan view thereof with parts shown in section, and

Fig. 3 is a rear elevational view with parts broken away and other parts shown in section.

Referring now more in detail to the drawings, the air condenser of my invention comprises a rotor plate set R and a plurality of stationary or stator plate sets generally designated as S′ and S² insulatably supported from each other and supported on the rotor plate set in such manner as to reduce to a minimum the strength of the electrostatic field between the rotor and stator plate sets at the mutual supporting regions thereof.

The rotor plate set or unit R which is preferably common to the plurality of stator plate sets comprises a plurality of plates 10′, 10′ for the stator plate set S′, and a plurality of plates 10², 10² for the stator plate set S², the said plates 10′ and 10² being fixed to a rotor shaft 11 which is journalled in opposite end bearings made in the form of bushings 12 and 13 threadedly received by metallic end plates 14 and 15 respectively, the bushings being adjustable in the end plates for adjusting the position of the rotor plates, and being locked in position by means of the nuts 16 and 17 which are threadedly received by the bushings, and which nuts engage the opposite walls of the end plates, as clearly shown in the drawings.

The rotor R and the end plates 14 and 15 are secured in position by means of the spaced posts 18, 18, (four in number) arranged at the edges of the condenser assembly, each of said posts being attached at its opposite ends to the end plates 14 and 15 by means of securing elements such as screws or bolts 19, 19, which screws are threadedly received by axially arranged recesses such as 20 (see Fig. 1) formed in the ends of the posts 18, 18. With this construction there is produced a rotor unit in which the end plates 14 and 15 are conductively integral with the condenser plates 10′ and 10². Preferably the rotor shaft 11 is electrically connected to the end plate 15 by an additional conductive connection 21 which is secured at its opposite ends to the shaft 11 and the end plate 15 respectively, one end forming a binding post or connector 22. Preferably the movement of the rotor is limited to a substantially 180° movement by a pin 23 fixed to the rotor shaft 11 and the cooperating pins or studs 23′ and 23² mounted in the end plate 15.

The stator plate set S′ comprises a plurality of plates 24′, 24′ arranged to interleave with the rotor plates 10′, 10′ in a manner well known in the art, and the said stator plates are secured to and carried by a plurality, and preferably a pair, of posts 25′ and 26′, the posts and plates forming a stator unit. For connecting the stator in circuit, the posts 25′ and 26′ may be provided with the connectors 27′, 27′.

Similarly the stator plate set S² comprises a plurality of plates 24², 24² arranged to interleave with the rotor plates 10², 10², and the said stator plates 24² are secured to and carried by a plurality such as a pair of posts 25² and 26² so as to form a unit therewith.

For independently connecting the stator S² in a circuit, the posts 25² and 26² thereof may be suitably provided with the connectors 27², 27².

In carrying out the principles of the present invention, the stators S′ and S² are insulatably mounted on each other and on the rotor R in a manner to minimize the absorption media in the electrostatic field therebetween so as to produce a very low loss condenser, with the inter-relation such as to permit the rapid assembly of the units by means of dovetailing interengaging devices.

The stators S′ and S² are insulatably connected together by means of a pair of insulating members 28 and 29, arranged intermediate the adjacent ends of the posts of the stators S′ and S², and in the preferred construction each of the insulating members is recessed at the opposite ends thereof for receiving the contiguous ends of the stator posts. In the preferred construction each of these insulating members comprises a tubular unit, as clearly shown in Fig. 1 of the drawings, each end of which receives a reduced pin or stud portion 30 integral with a stator post such as the post 26² illustrated in Fig. 1 of the drawings, a washer 31 being preferably interposed between the post and the adjacent end of the insulating member. With this construction it will be seen that the stator units may be assembled one with respect to the other by merely placing the insulating members intermediate the stators and inserting the pin or stud portions of the stator posts in the ends of the insulating members, the assembling of these parts being thus obtained without the use of securing elements such as screws or bolts. It will be further seen that the pair of insulating members 28 and 29 connect metallic portions which are usually employed at the same potential and that the same are arranged relatively to the rotor R in a very weak electrostatic field, this organization thus contributing in reducing to a minimum the losses of the condenser.

For supporting the stator units S′ and S² on the rotor unit R, I provide a plurality of insulating pieces or members, and preferably a plurality of pairs of such insulating pieces, a pair of insulating pieces being carried by each end supporting plate and carrying the adjacent end of a stator unit. The said insulating pieces comprise more specifically a pair of beams 32 and 33 forming one pair of insulating supports and associated with the end plate 14, and a second pair of beams 34 and 35 forming the other pair of insulating supports and associated with the end plate 15.

For minimizing the amount of volume of insulating material while utilizing the maximum supporting strength of the same, the insulating beams 32—35 are each arranged in a plane normal to the plane of the end supporting plates 14 and 15, and more specifically, each of these insulating beams transversely carried by the end supporting plates is made of an insulating sheet material and is arranged with the plane of the sheet material normal to the plane of the end supporting plates so that the plane of the sheet material is parallel to the supporting thrusts which are effective on the stator posts 25′, 25² and 26′, 26². Desirably also, each of the beams 32—35 is carried by the end supporting plates at its opposite ends, and is connected to the stator supporting posts at points intermediate its ends in a manner to be described presently. With this construction it will be noted that the thickness and width of the insulating beams may be reduced to a minimum, while the maximum strength of the material is utilized for supporting purposes.

For minimizing the strength of the electrostatic field in the region of the insulating beams 32—35, the condenser is designed and constructed so as to reduce the mass of metal in the region of said insulating supports and to increase the distance between conductors of opposite potentials. To accomplish this, it is desirable to eliminate all securing elements which are usually employed for attaching the rotor and stator units to the insulating supports, since these securing elements increase the metallic mass and increase therefore the electrostatic lines of force through the dielectric; and in the condenser of the present construction the end plates 14 and 15, the stator supporting posts 25′, 25², 26′ and 26² and the insulating beams 32—35 are provided with dovetailing interengaging means constructed so as to reduce the volume of metal and increase the distance between the conductors of opposite potentials, the interengaging means being moreover so designed as to effect the rigid securing or locking of the stator plates in supported position, and to permit the rapid assembling operations heretofore referred to.

In the preferred construction, for obtaining the interengagement between the supporting elements, each beam is notched at its opposite ends as at 36 and 37, and is notched at a region 38 (see Fig. 1) intermediate its ends, these notches being provided for interengagement with locking elements formed integrally with the end plates and stator posts. For interengagement with an intermediate notch 38, the stator posts are grooved at their outer ends as shown at 39 (see Fig. 1), the end of a stator post having a forked construction which dovetails with the notch 38, the tines of the fork engaging the opposite walls of a supporting beam. For interengagement with the notches 36 and 37, each end plate is provided with a plurality of upstanding lugs forming cradles, each cradle consisting of two outer lugs 40 and 41 and an inner lug 42 arranged so as to engage with opposite walls of the beam, as clearly shown in the drawings, the seating of each cradle in its complemental notch and the dovetailing of the stator posts with the beams producing a construction in which each stator unit is effectively locked to the rotor unit against movement in any direction.

By providing the interengaging dovetailing means for the supporting beams 32—35 as well as for the insulating members 28 and 29, not only is the necessity for additional metallic securing elements obviated and the assembling of the parts facilitated, but a better distribution of dielectric loss is produced because the source of high potential area is reduced to less than one-half of the beam thickness, and is limited to a surface rather than to a volume dielectric effect. To further minimize the mass of metal in the region of the absorption dielectric, the sides of the end plates 14 and 15 are excised or cut away, as clearly shown in the drawings. The assembled condenser is constructed so as to be mountable on the usual support or panel 43, the end plate 14 being provided with the spacing members 44, 44 secured to the end plate, said spacing members receiving securing screws 45, 45 for attachment to the panel 43.

While I have shown the preferred embodiment of my invention, it will be apparent that many changes and modifications may be made in the structure disclosed, without departing from the spirit of the invention, defined in the following claims.

I claim:

1. A variable air condenser comprising, in combination, a rotor plate set, end supporting plates therefor, frame members interconnecting the end plates, a plurality of stator plate sets arranged to interleave with the rotor plate set, and means for supporting the stator plate sets insulated from each other and on the end supporting plates, said means consisting of insulating members intermediate the stator plate sets and pairs of transversely arranged insulating beams, a pair carried by each of the end supporting plates and carrying one side of a stator plate set, each of said beams being arranged in a plane normal to the plane of the supporting plates.

2. In a variable air condenser, a rotor comprising a rotor plate set, metallic end supporting plates conductively integral therewith and a plurality of posts connecting the end supporting plates, a stator comprising a plurality of stator plate sets and posts carrying the same, and means supporting the stator plate sets on the rotor consisting of insulating members arranged between the posts of one stator plate set and the posts of the other stator plate sets and pairs of transversely arranged insulating beams, a pair carried by each of the end supporting plates and connected to the adjacent stator posts at one end of the latter, each of the insulating beams being made of an insulating sheet material and being arranged with the plane of the sheet material normal to the planes of the end supporting plates so that the plane of the sheet material is parallel to the supporting thrusts on the stator posts.

3. A variable air condenser comprising a rotor plate set, end supporting plates therefor, a plurality of stator plate sets and means supporting the stator plate sets insulated from each other and on the end supporting plates, the said means consisting of a plurality of insulating members arranged between the stator plate sets and of insulating pieces carried by the end plates and carrying the stator plate sets, the said end plates, stator plate sets, insulating members and insulating pieces being provided with interengaging means effective for locking the stator plate sets in supported position.

4. A variable air condenser comprising a rotor plate set, end supporting plates therefor, a plurality of stator plate sets and means for supporting the stator plate sets insulated from each other and on the end supporting plates, said means consisting of insulating members arranged between the stator plate sets and of pairs of transversely arranged insulating beams, a pair carried by each of the end supporting plates and connected to one side of a stator plate set, the said end plates, stator plate sets, insulating members and insulating beams being provided with dovetailing interengaging means effective for locking the stator plate sets in supported position.

5. A variable air condenser comprising a rotor plate set, end supporting plates therefor, a plurality of stator plate sets and means for supporting the stator plate sets insulated from each other and on the end supporting plates, said means consisting of insulating members arranged at regions between the stator plate sets and pairs of transversely arranged insulating beams, a pair carried by each of the end supporting plates and carrying one side of a stator plate set, each of the insulating beams being carried by its supporting plate at spaced regions thereon and being connected to the stator plate set at a region intermediate the spaced regions, the said end plates, stator plate sets, insulating members and insulating beams being provided at said regions with dovetailing interengaging means effective for locking the stator plate sets in supported position.

6. In a variable air condenser, a rotor unit comprising a rotor plate set and metallic end supporting plates conductively integral therewith, stator units comprising a plurality of stator plate sets and a plurality of posts carrying each of the same, and means supporting the stator units on the rotor unit consisting of a plurality of insulating members and pairs of transversely arranged insulating beams, each of the insulating members being arranged between and connecting adjacent posts of the stator plate sets and a pair of the insulating beams being carried by each of the end supporting plates and connected to one of the posts of a stator plate set, each of the said beams being notched at its opposite ends and at a point intermediate such ends, each of the stator posts being grooved at one end for interengaging with the intermediate notch of a beam and being provided with a pin at the other end received by an insulating member, and the end plates being provided with integral upstanding lugs forming cradles interengaging with opposite ends of the insulating beams at the notches provided therein, the interengagement between the parts being effective for locking the stator units to the rotor unit against movement in all directions.

7. In a variable air condenser, a rotor plate set, end supporting plates therefor, a plurality of stator plate sets and means for supporting one of the stator plate sets relatively to the other and an end supporting plate, said means comprising insulating members arranged between the stator plate sets and insulating pieces arranged between the said end plate and the supported stator plate set, the said end plate, stator plate set, insulating members and insulating pieces being provided with interengaging means effective for locking the stator plate set in supported position.

8. In a variable air condenser, a rotor plate set, end supporting plates therefor, a plurality of stator plate sets and means for supporting one of the stator plate sets relatively to the other and an end supporting plate, said means comprising a pair of posts carrying the stator plate set, insulating members arranged between the posts and the other stator set, and insulating pieces arranged between the said end plate and the said posts, the said end plate, posts, insulating members and insulating pieces being provided with interengaging means effective for locking the stator plate set in supported position.

9. In a variable air condenser, a rotor plate set, end supporting plates therefor, a plurality of stator plate sets and means for supporting one of the stator plate sets relatively to the other and an end supporting plate, the said means comprising posts carrying the stator plate set, insulating members arranged between the posts and the other stator plate set and a pair of insulating beams located between the end plate and the said posts, the said insulating members each comprising a recessed element receiving an end of a stator post.

10. A variable low loss condenser comprising in combination, a frame including a pair of end plates and frame members interconnecting said end plates, a plurality of stator plate sets in said frame and means for supporting the stator plate sets insulated from each other and from the end supporting plates, said means consisting of insulating members arranged between the stator plate sets and insulating pieces arranged between the end supporting plates and the adjacent ends of the stator plate sets, a shaft journaled in said end plates and sets of rotor plates carried by said shaft and arranged to be interleaved between said sets of stator plates whereby the mutual capacity between said sets of plates may be simultaneously varied by rotation of said shaft.

11. A multiple variable condenser comprising in combination a pair of end plates, frame members interconnecting said plates, a plurality of alternately positioned conductive blocks and insulators supported with relation to said frame members along the length thereof, the sets of stator plates carried by said conductive blocks in spaced relationship, a central rotatable shaft, rotor plates carried by said shaft and arranged to be interleaved between said stator plates for varying the mutual capacity between said sets of plates simultaneously.

12. A multiple variable condenser comprising, in combination, a frame including a pair of end plates and frame members interconnecting said end plates, a plurality of independent sets of stator plates, insulation means interposed between said sets of stator plates and between the said sets of stator plates and said frame whereby both sets of said stator plates are substantially insulated from one another and from said frame, a shaft journaled in said end plates, sets of rotor plates carried by said shaft and arranged to be interleaved between said sets of stator plates whereby the mutual capacity between said sets of plates may be simultaneously varied by rotation of said shaft.

13. A multiple variable condenser comprising, in combination, a frame including a pair of end plates and frame members interconnecting said end plates, a plurality of independent sets of stator plates, conductive blocks supporting said stator plates in spaced relationship one from another, insulation means interposed between said conductive blocks and between the said conductive blocks and said frame whereby both sets of said stator plates are supported in said frame insulated from one another and from said frame, a shaft journaled in said end plates, sets of rotor plates carried by said shaft and arranged to be interleaved between said sets of stator plates whereby the mutual capacity between said sets of plates may be simultaneously varied by rotation of said shaft.

Signed at New York city, in the county of New York and State of New York, this 24th day of January A. D., 1925.

CHARLES HARDY.